Sept. 13, 1966  A. J. STOCK  3,272,314
UNDER-BUNKER CONVEYOR
Filed Jan. 6, 1964  3 Sheets-Sheet 1
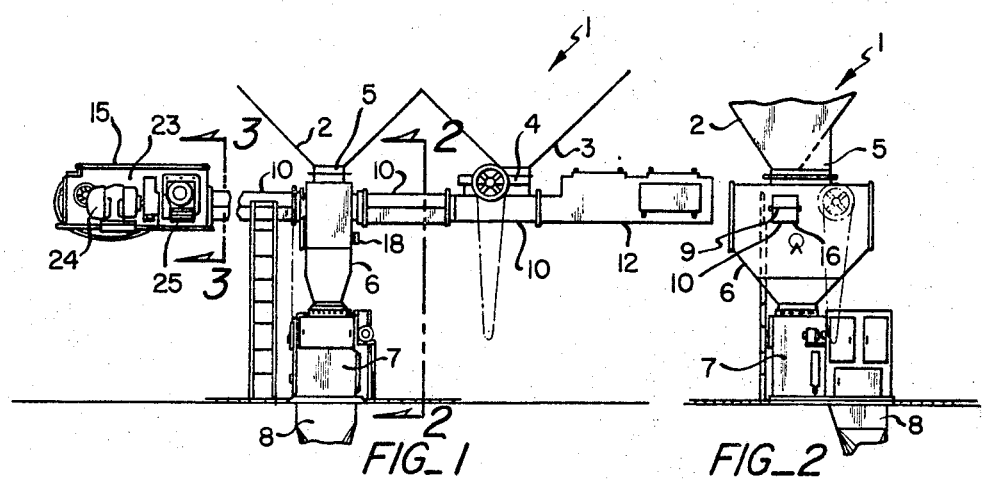
FIG_1    FIG_2
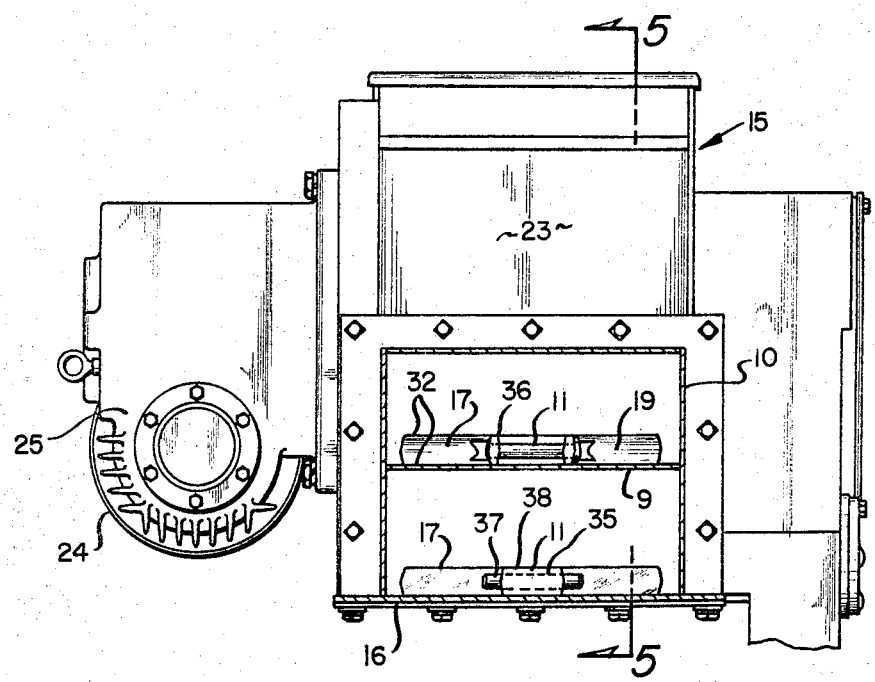
FIG_3
INVENTOR.
ARTHUR J. STOCK
BY
Oberlin, Maky & Donnelly
ATTORNEYS

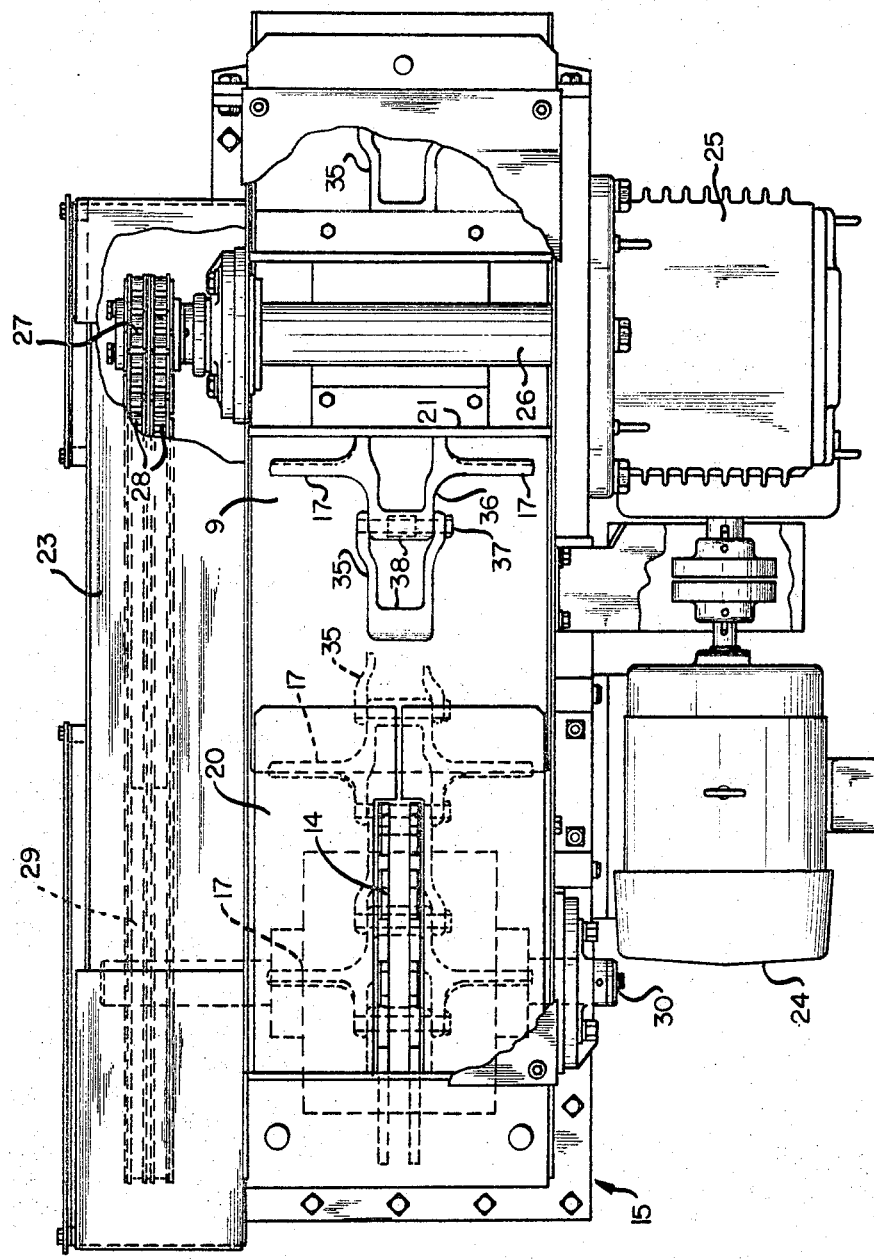

Sept. 13, 1966  A. J. STOCK  3,272,314
UNDER-BUNKER CONVEYOR
Filed Jan. 6, 1964  3 Sheets-Sheet 3
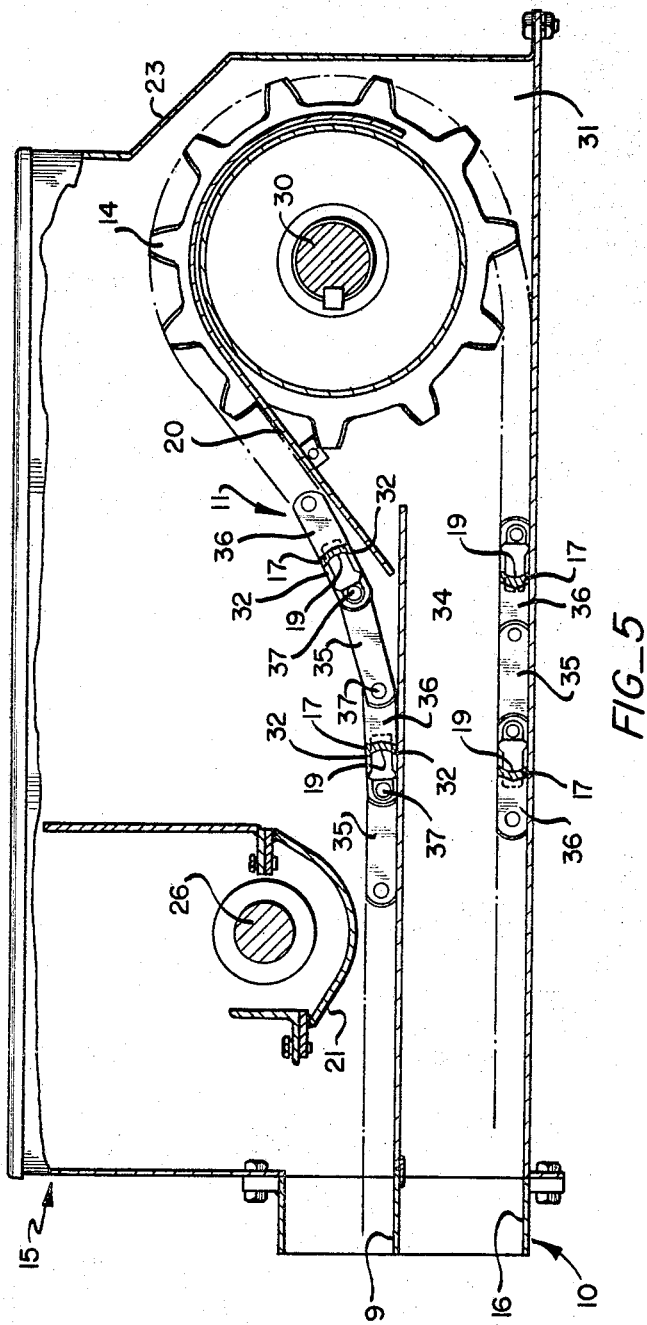
FIG_5
INVENTOR.
ARTHUR J. STOCK
BY
Oberlin, Maky & Donnelly
ATTORNEYS

United States Patent Office 3,272,314
Patented Sept. 13, 1966

3,272,314
UNDER-BUNKER CONVEYOR
Arthur J. Stock, Lakewood, Ohio, assignor to Stock Equipment Company, Cleveland, Ohio, a corporation of Ohio
Filed Jan. 6, 1964, Ser. No. 335,773
5 Claims. (Cl. 198—159)

The present invention relates generally to a conveyor and more particularly to an under-bunker conveyor adapted for installation beneath a multi-outlet coal bunker and operative to convey coal from a selected bunker outlet to a selected boiler or boilers.

As well known in the art a conventional under-bunker conveyor comprises an elongated housing of rectangular cross-section having a series of openings through its top wall registering with the respective bunker outlets, coal valves being installed at the bunker outlets to selectively open and close said outlets. The housing has a longitudinally extending upper support or partition between its top and bottom walls onto which the coal is discharged from an open bunker outlet. Secured at opposite ends of the housing are drive sprocket and take-up sprocket assemblies over which an endless conveyor chain with transverse drag bars is trained, the top course of the chain moving through the housing along said upper support to drag coal thereon toward the takeup sprocket assembly. The aforesaid upper support terminates short of the takeup sprocket, whereby the coal dragged by the conveyor bars to that end of the upper support drops by gravity onto the bottom wall or lower support of the housing and is thereby conveyed by the drag bars of the bottom course of the chain in the opposite direction, that is, toward the drive sprocket assembly. The lower support or bottom wall of the housing has discharge valves at longitudinally spaced intervals therealong through which the coal dragged along said lower support of the housing is discharged to a selected surge hopper, stoker or the like when the associated discharge valve is open.

Hitherto, the drag bars of the conveyor chain have been provided with essentially flat or slightly convex leading faces. There has been a tendency to build up of a crust of the coal fines on both the upper and lower supports of the conveyor housing which may increase the coefficient of friction of the coal and chain on said supports. Another problem encountered with known under-bunker conveyors is that some of the coal will be conveyed past an open discharge valve of the housing. In the past, this residual coal or dribble was dumped down a chute at the drive sprocket assembly into a suitable receptacle and, of course, this practice necessitates either periodic emptying of the receptacle or the provision of a secondary conveyor in said receptacle.

Another solution to this problem of what to do with the residual coal which is conveyed to the drive sprocket end of the conveyor has been to provide a separate dribble return conveyor such as is disclosed in the patent to Arthur J. Stock, Pat. No. 2,853,178, dated September 23, 1958. In said patent the residual coal is discharged into a screw conveyor extending longitudinally beneath the drive sprocket assembly which feeds the dribble to a bucket loop elevator having buckets arranged to scoop and raise the dribble and dump it onto the upper support of the conveyor housing whereby the drag bars of the top course of the chain are effective to reconvey the dribble through the housing toward the takeup sprocket.

With the foregoing in mind it is a principal object of this invention to provide a dribble return arrangement which is built into the chain and drive sprocket assembly in such a way as to eliminate the need for any dribble removal arrangement or dribble return conveyors of the character referred to.

It is another object of this invention to provide an under-bunker conveyor in which the drag bars of the conveyor chain have concave leading faces providing relatively sharp acute angle edges which scrape clean the surfaces of the upper and lower supports along which the coal is dragged in opposite directions through the conveyor housing thereby preventing build up of a crust of coal fines on such surfaces, the scraping action being much like that of a snow plow dragged along a road surface.

It is another object of this invention to provide an under-bunker conveyor of the character referred to in which concave leading faces of the drag bars of the conveyor chain tend to curl the coal crud and thus minimize sticking thereof on the drag bars and, in addition, said concave faces assist in the carrying of the dribble around the drive sprocket for deposit of the dribble onto the upper support for recirculation through the housing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a diagrammatic side elevation view of a typical under-bunker conveyor installation;

FIG. 2 is a cross-section view taken along line 2—2, FIG. 1;

FIG. 3 is a cross-section view on enlarged scale taken along line 3—3, FIG. 1;

FIG. 4 is a top plan view on enlarged scale of the drive sprocket assembly located at the left side of FIG. 1; and FIG. 5 is a cross-section view taken along line 5—5, FIG. 3.

Referring now more particularly to the drawings, and first to FIGS. 1 and 2, the reference numeral 1 denotes the lower portion of a coal bunker showing two of the several outlets 2 and 3 thereof. Each outlet 2 and 3 has installed therein a coal valve of which the valve 4 is operative to either open or close the bunker outlet 3 and of which the valve 5 is a so-called triple valve which means that when the right-hand portion as viewed in FIG. 2 is open, coal flows by gravity from the bunker outlet 2 into the surge hopper 6 to the inlet of the coal scale 7 and thence to the scale outlet hopper 8 leading to a stoker hopper (not shown), a pulverizer feeder or the like. When it is desired to convey coal from this bunker outlet 2 to a different boiler (not shown), another portion of the triple valve 5 is opened to allow coal to flow onto the upper support 9 in the conveyor housing 10. As aforesaid, the coal thus flowing onto the upper support 9 is dragged therealong by the drag bars of the top course of the conveyor chain toward the right as viewed in FIG. 1.

The conveyor chain 11 (see FIGS. 3, 4, and 5) is trained over a takeup sprocket in the takeup sprocket assembly 12 secured to one end of the conveyor housing 10 and over a drive sprocket 14 disposed in the drive sprocket assembly 15 secured at the other end of the conveyor housing 10.

Also as previously explained, the aforesaid upper support 9 in the conveyor housing 10 terminates ahead of the takeup sprocket and thus the coal which is dragged therealong toward the right drops down onto the bottom wall or lower support 16 of the conveyor housing 10, whereupon the coal is then dragged by the drag bars 17

(see FIGS. 3, 4, and 5) of the bottom course of the chain 11 toward the left for discharge through the now open discharge valve 18 associated with a surge hopper other than the one shown in FIG. 1. When a selected surge hopper 6 is full, the coal will be conveyed therepast for discharge through the next open discharge valve 18. Of course, if there is no demand for coal at any of the housing discharge openings, suitable controls will be provided to stop the conveyor. The coal being conveyed by the chain 11 has a depth considerably greater than the depth of the chain itself, in fact it nearly fills the space between the upper support 9 and the top wall of housing 10 and the space between said lower and upper supports 16 and 9. Even though the conveyor stops when there is no demand for coal at any of the housing discharge openings having open discharge valves, some residual coal or dribble will adhere to or remain on the chain 11. If not otherwise disposed of, said residual coal can fall off chain 11 as the chain passes over drive sprocket 14, thus accumulating in drive sprocket housing 15 and ultimately jamming the conveyor.

Referring now to FIGS. 3 to 5, it can be seen that the drag bars 17 of the chain have concave leading faces 19 which provide relatively sharp acute angle top and bottom edges which are effective alternately to scrape clean the upper and lower supports 9 and 16 in the conveyor housing 10. Moreover, such shaping of the leading faces 19 of the drag bars 17 renders them effective to carry such residual coal or dribble over the drive sprocket 14 for deposit onto the downwardly sloping plate 20 which is curved around the hub of the drive sprocket 14 and within the chain 11 as it passes around the drive sprocket 14.

In order that the conveyor housing 10 be of minimum vertical height the slack side of the chain 11, that is, the top course thereof, passes beneath a curved plate 21 extending transversely across the drive housing 23.

Insofar as the chain drive mechanism is concerned, the drive housing 23 has mounted thereon a drive motor 24 which is coupled to the input shaft of a speed reducer 25. The output shaft 26 of the latter extends transversely across the housing and is protected by the aforesaid curved plate 21 therebeneath. The output shaft 26 has a small sprocket 27 thereon over which the chains 28 are trained to drive the conveyor chain sprocket 14 through a relatively larger sprocket 29 mounted on the drive shaft 30 of the conveyor sprocket 14.

When the operation of this under-bunker conveyor is started, the residual coal may initially collect in the corner 31 of the drive housing 23 and also on the portion 34 of the sloping plate 20 which is spaced from the bottom edges of the conveyor chain 11 and drag bars 17, but such collection of dribble has no harmful effects because build up is limited as the sharp edges 32 of the drag bars 17 pass around these areas. As evident, as the drag bars 17 move in contact with the respective coal support surfaces, the relatively sharp edges 32 being inclined, as shown, will tend to scrape said surfaces clean. Furthermore, the concave leading faces 19 of the drag bars 17 cause them to function in the manner of buckets or scoops to raise the residual coal or dribble around and over the plate 20 for dumping on the downwardly sloping portion 34 of said plate as the chain 11 travels over the top of the drive sprocket 14 and said plate 20.

Insofar as the conveyor chain itself is concerned, the alternate links 35 and 36 are of generally U-shaped form connected together by means of the pins 37. The bores of the link barrels 38 are undercut as shown for filling with grease or like lubricant. In the present case every other link 36 has integral drag bars 17 but, if desired, every link may be provided with such bars or only every third or fourth link. It is to be understood that the conveyor chain may comprise spaced, parallel endless chains having transverse drag bars therebetween.

Another notable feature of the present invention is that the plate 20 additionally serves to prevent excessive wrapping of the conveyor chain 11 around the drive sprocket 14 in the event that there is too much slack in the top course thereof.

Other modes of applying the principle of the invention may be employed, change being made as regards the details described, provided the features stated in any of the following claims, or the equivalent of such, be employed.

I therefore particularly point out and distinctly claim as my invention:

1. An under-bunker conveyor of the type having an endless chain trained over horizontally spaced apart sprockets and provided with transverse drag bars which upon driving of one of said sprockets move successively in opposite directions with the upper course of said chain in contact with an upper support of a conveyor housing and with the lower course of said chain in contact with a lower support of said housing, bulk material on said upper support being dragged by said drag bars for discharge therefrom onto said lower support and thence being dragged by said drag bars in the opposite direction along said lower support toward said one sprocket and for discharge through an opening in said lower support, said conveyor being characterized in that an extension of said upper support is disposed beneath said chain adjacent the upper portion of said one sprocket, and in that said drag bars have concave leading faces which function as scoops for conveying residual material not discharged through such opening around said one sprocket for deposit on said extension for recirculation through said conveyor housing.

2. The conveyor of claim 1 wherein said bars have relatively sharp acute angle edges to scrape clean said upper and lower supports as said drag bars move therealong.

3. The conveyor of claim 1 wherein said extension includes a curved end means which extends downwardly partway around the inside of said chain to facilitate elevating of the residual material by said drag bars up around said curved end means to said extension.

4. In an under-bunker conveyor of the type wherein an endless drag chain having transverse drag members is trained over a drive sprocket to provide upper and lower courses which drag material in opposite directions successively along upper and lower supports for discharge through an opening in the latter, the improvement which comprises providing concave leading faces on at least a portion of said transverse drag members to constitute scoops to reconvey residual material around said drive sprocket from said lower support onto said upper support.

5. The under-bunker conveyor of claim 4 wherein said upper support has an extension means which slopes upwardly toward the upper portion of said drive sprocket and curves downwardly within said chain to constitute a support along which said transverse drag members elevate material for dumping onto the sloped portion of said extension.

References Cited by the Examiner
UNITED STATES PATENTS

| | | | |
|---|---|---|---|
| 1,475,596 | 11/1923 | Redler | 198—159 |
| 1,770,650 | 7/1930 | Levin | 198—171 |
| 2,400,502 | 5/1946 | Hapman | 198—174 |
| 2,916,134 | 12/1959 | Davenport | 198—85 |

EVON C. BLUNK, Primary Examiner.

WILLIAM B. LA BORDE, Examiner.

R. E. KRISHER, Assistant Examiner.